US011244160B2

(12) United States Patent
Bushmitch et al.

(10) Patent No.: US 11,244,160 B2
(45) Date of Patent: Feb. 8, 2022

(54) STITCHED IMAGE

(71) Applicant: The Government of the United States, as represented by the Secretary of the Army, Washington, DC (US)

(72) Inventors: Dennis Bushmitch, Somerset, NJ (US); Michael Badger, Ocean Grove, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 814 days.

(21) Appl. No.: 15/273,924

(22) Filed: Sep. 23, 2016

(65) Prior Publication Data
US 2017/0228903 A1    Aug. 10, 2017

Related U.S. Application Data

(62) Division of application No. 13/547,352, filed on Jul. 12, 2012, now Pat. No. 9,870,504.

(51) Int. Cl.
*G06T 11/60* (2006.01)
*G06T 7/33* (2017.01)
(Continued)

(52) U.S. Cl.
CPC .......... *G06K 9/0063* (2013.01); *B64C 39/024* (2013.01); *G06K 9/00771* (2013.01); *G06T 3/4038* (2013.01); *G06T 3/4053* (2013.01); *G06T 5/50* (2013.01); *G06T 7/33* (2017.01); *G06T 7/38* (2017.01); *G06T 11/60* (2013.01); *H04N 5/23238* (2013.01); *H04N 5/23293* (2013.01); *H04N 5/2624* (2013.01); *H04N 5/28* (2013.01); *H04N 7/185* (2013.01); *B64C 2201/08* (2013.01); *B64C 2201/123* (2013.01); *B64C 2201/127* (2013.01);
(Continued)

(58) Field of Classification Search
CPC .............................. G06T 11/60; G06K 9/0063
USPC ......................................................... 345/634
See application file for complete search history.

(56) References Cited

U.S. PATENT DOCUMENTS 3,700,438 A    10/1972  Yost, Jr.
3,962,537 A     6/1976  Kearns et al.
(Continued)

FOREIGN PATENT DOCUMENTS

FR    WO 2010063916       6/2010

OTHER PUBLICATIONS

Low-Cost Orthographic Imagery Peter Pesti et al., ACM GIS 08, Nov. 5-7, 2008.*
(Continued)

*Primary Examiner* — Javid A Amini
(74) *Attorney, Agent, or Firm* — Ronald Krosky

(57) ABSTRACT

Various embodiments associated with a composite image are described. In one embodiment, a handheld device comprises a launch component configured to cause a launch of a projectile. The projectile is configured to capture a plurality of images. Individual images of the plurality of images are of different segments of an area. The system also comprises an image stitch component configured to stitch the plurality of images into a composite image. The composite image is of a higher resolution than a resolution of individual images of the plurality of images.

20 Claims, 13 Drawing Sheets

(51) Int. Cl.

| | |
|---|---|
| *G06K 9/46* | (2006.01) |
| *G06K 9/64* | (2006.01) |
| *G06K 9/00* | (2006.01) |
| *H04N 7/18* | (2006.01) |
| *H04N 5/262* | (2006.01) |
| *H04N 5/232* | (2006.01) |
| *G06T 3/40* | (2006.01) |
| *G06T 7/38* | (2017.01) |
| *B64C 39/02* | (2006.01) |
| *G06T 5/50* | (2006.01) |
| *H04N 5/28* | (2006.01) |
| *G06K 9/20* | (2006.01) |

(52) U.S. Cl.
CPC ............... *G06K 2009/2045* (2013.01); *G06T 2207/10032* (2013.01); *G06T 2207/20221* (2013.01); *G06T 2207/30181* (2013.01); *G06T 2207/30212* (2013.01)

(56) References Cited

U.S. PATENT DOCUMENTS

| | | | |
|---|---|---|---|
| 4,267,562 A | 5/1981 | Raimondi | |
| 4,770,370 A | 9/1988 | Pinson | |
| 4,907,763 A | 3/1990 | Pinson | |
| 6,056,237 A * | 5/2000 | Woodland | B64C 3/40 244/3.15 |
| 6,119,976 A | 9/2000 | Rogers | |
| 6,133,943 A * | 10/2000 | Needham | G06T 3/4038 348/37 |
| 6,227,484 B1 * | 5/2001 | Miyake | B64B 1/50 244/115 |
| 6,380,889 B1 | 4/2002 | Herrmann et al. | |
| 6,453,055 B1 | 9/2002 | Fukumura et al. | |
| 6,525,772 B2 * | 2/2003 | Johnson | H04N 9/12 348/189 |
| 6,535,650 B1 * | 3/2003 | Poulo | G06T 3/4038 382/284 |
| 6,694,064 B1 * | 2/2004 | Benkelman | G06K 9/0063 348/144 |
| 6,924,838 B1 * | 8/2005 | Nieves | H04N 5/2251 348/143 |
| 6,978,717 B1 | 12/2005 | Hambric | |
| 7,373,849 B2 | 5/2008 | Lloyd et al. | |
| 7,397,501 B2 | 7/2008 | Afsenius | |
| 7,437,985 B2 | 10/2008 | Gal | |
| 7,631,601 B2 | 12/2009 | Feldman et al. | |
| 7,679,037 B2 | 3/2010 | Eden et al. | |
| 8,068,693 B2 | 11/2011 | Sorek et al. | |
| 8,462,209 B2 * | 6/2013 | Sun | G01C 11/025 348/144 |
| 8,594,475 B2 | 11/2013 | Cottrell et al. | |
| 9,014,415 B2 * | 4/2015 | Chen | G06T 7/0002 382/100 |
| 9,398,264 B2 * | 7/2016 | Georgiev | G06T 3/4038 |
| 9,430,876 B1 * | 8/2016 | Loxam | G06T 19/006 |
| 9,465,129 B1 * | 10/2016 | Olsson | G01V 3/38 |
| 2001/0019636 A1 * | 9/2001 | Slatter | G06K 9/20 382/284 |
| 2001/0036295 A1 | 11/2001 | Hendrickson et al. | |
| 2003/0020829 A1 * | 1/2003 | Croasdale | B63G 8/38 348/375 |
| 2004/0017386 A1 | 1/2004 | Liu et al. | |
| 2004/0075585 A1 | 4/2004 | Kaiser et al. | |
| 2004/0125138 A1 * | 7/2004 | Jetha | G06F 3/0481 715/764 |
| 2005/0076054 A1 | 4/2005 | Moon et al. | |
| 2006/0041375 A1 * | 2/2006 | Witmer | G01C 15/00 701/532 |
| 2006/0053534 A1 | 3/2006 | Mullen | |
| 2007/0025723 A1 * | 2/2007 | Baudisch | G03B 13/02 396/287 |
| 2007/0097206 A1 * | 5/2007 | Houvener | G03B 35/08 348/26 |
| 2008/0030592 A1 * | 2/2008 | Border | H04N 5/232 348/218.1 |
| 2008/0192053 A1 * | 8/2008 | Howell | G06K 9/0063 345/427 |
| 2008/0196578 A1 * | 8/2008 | Eden | F42B 12/365 89/1.11 |
| 2008/0293488 A1 * | 11/2008 | Cheng | A63F 13/10 463/31 |
| 2008/0309774 A1 | 12/2008 | Goh et al. | |
| 2009/0005167 A1 | 1/2009 | Arrasvuori et al. | |
| 2009/0021576 A1 * | 1/2009 | Linder | G03B 37/00 348/36 |
| 2009/0022422 A1 * | 1/2009 | Sorek | G06T 3/4038 382/284 |
| 2009/0086022 A1 * | 4/2009 | Finn | G08B 13/1963 348/143 |
| 2009/0208062 A1 * | 8/2009 | Sorek | H04N 5/232 382/107 |
| 2009/0260511 A1 * | 10/2009 | Melnychuk | F41G 3/147 89/1.11 |
| 2009/0268983 A1 | 10/2009 | Stone et al. | |
| 2010/0026809 A1 | 2/2010 | Curry | |
| 2010/0093270 A1 * | 4/2010 | Bass | F42B 12/365 455/1 |
| 2010/0283853 A1 * | 11/2010 | Acree | G01C 11/00 348/144 |
| 2011/0022433 A1 * | 1/2011 | Nielsen | G06Q 10/06 705/7.27 |
| 2011/0037639 A1 * | 2/2011 | Duran Toro | G01S 13/885 342/22 |
| 2011/0043604 A1 * | 2/2011 | Peleg | G06T 3/4038 348/36 |
| 2011/0049290 A1 | 3/2011 | Seydoux et al. | |
| 2011/0141300 A1 * | 6/2011 | Stec | G06T 3/4038 348/222.1 |
| 2011/0160941 A1 | 6/2011 | Garrec et al. | |
| 2011/0170800 A1 * | 7/2011 | Curlander | G06T 17/05 382/294 |
| 2011/0234750 A1 * | 9/2011 | Lai | G03B 37/04 348/37 |
| 2012/0196320 A1 * | 8/2012 | Seibel | G01N 1/30 435/40.52 |
| 2013/0216089 A1 * | 8/2013 | Chen | G06T 7/0002 382/100 |
| 2014/0132714 A1 | 5/2014 | Goh | |
| 2015/0297949 A1 * | 10/2015 | Aman | G06F 16/70 348/157 |
| 2016/0156880 A1 * | 6/2016 | Teich | H04N 5/225 348/82 |

OTHER PUBLICATIONS

Aerial image stitching, Dino Repac, 2018.*
Homography Estimation by Elan Dubrofsky B.Sc., Carleton University, 2007.*
Distinctive Image Features from Scale-Invariant Keypoints David G. Lowe Computer Science Department, 2004.*
"Low-Cost Orthographic Imagery" 2008 ACM, Peter Pesti et al.*
BBC News, Grenade camera to aid UK troops, http://news.bbc.co.uk/2/hi/technology/7734038.stm, Nov. 18, 2008, 2 pages.

* cited by examiner

STITCHED IMAGE

CROSS-REFERENCE

This application is a divisional application of, and claims priority to, U.S. patent application Ser. No. 13/547,352. The entirety of U.S. patent application Ser. No. 13/547,352 is incorporated by reference.

GOVERNMENT INTEREST

The innovation described herein may be manufactured, used, imported, sold, and licensed by or for the Government of the United States of America without the payment of any royalty thereon or therefor.

BACKGROUND OF THE INVENTION

In a combat context, an aerial image of a Warfighter's geographical locale can be used to help soldiers to better understand their surroundings, make tactical decisions, identify an enemy, and the like. The image can be taken by an airplane or an aerial drone and this aerial image can be further relayed to a soldier by means of radios and mobile computing platforms. The solider can use information provided in the aerial image to make critical warfighting and life preservation decisions. For example, the aerial image can show terrain information. Based on this terrain information, the soldier can create a travel path to lower travel difficulty, determine a preferable location for possible enemy engagement, etc. Thus, the aerial image is used to help the soldier. An expensive and sophisticated aerial drone systems can be used, but these systems can be difficult to operate, relatively large in size and weight, and therefore limit their battlefield proliferation amongst military personnel.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
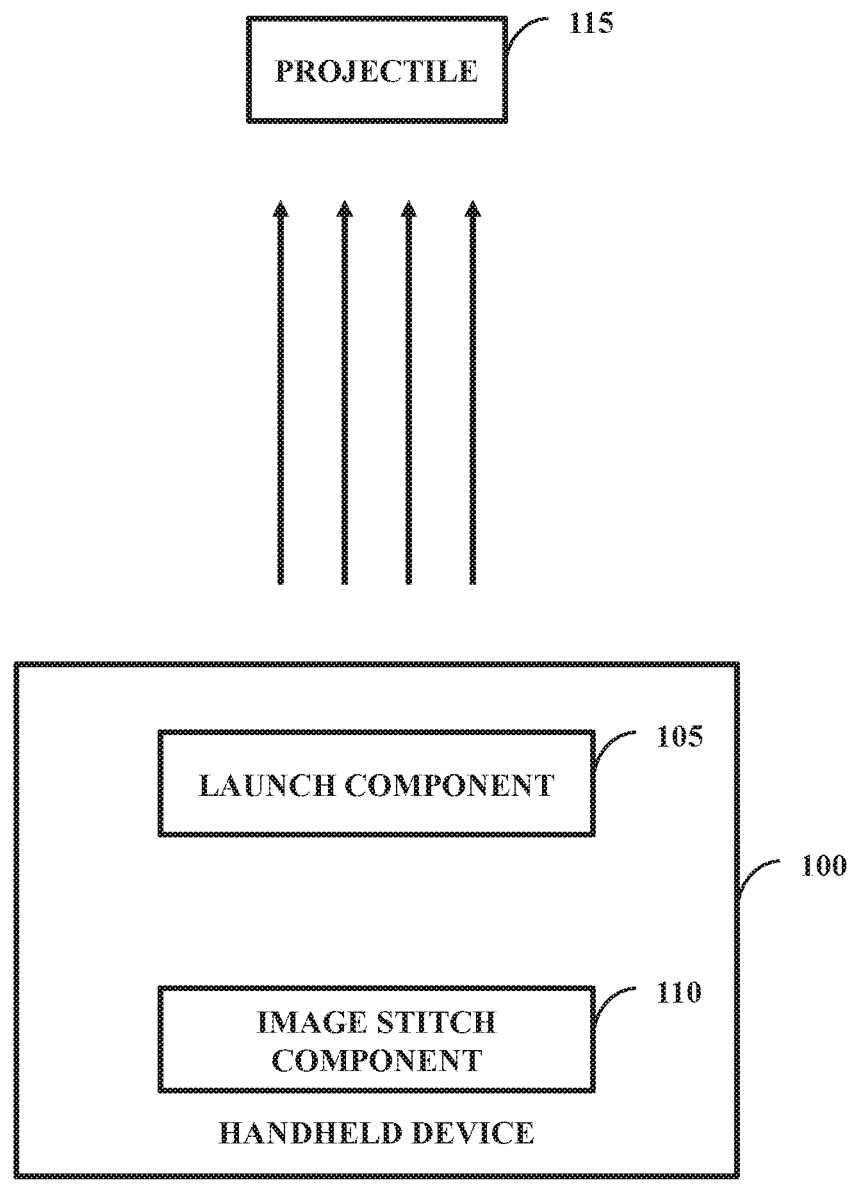
FIG. 1 illustrates one embodiment of a handheld device with a launch component and an image stitch component.

Systems, methods and other embodiments disclosed herein are related to using a stitched image to help the solider. As discussed in the background, the soldier can use the aerial image to gain information. However, the aerial image can quickly become outdated and therefore while some information can be useful, such as terrain information, other information can be less helpful or even detrimental, such as enemy soldier location.

To obtain up-to-date information, the soldier can employ a small projectile that is launched in the air and that obtains images. For example, six images of sixty degrees can be taken with slight overlap by the small projectile. The six images can be stitched together to form a stitched image covering 360 degrees. The stitched image covering 360 degrees can be displayed on an interface of a handheld device of the solider or on a separate interface (e.g., displayed on a screen of a laptop computer). Therefore, the soldier can quickly obtain up-to-date information about his surroundings.

In one embodiment, the stitched image can be overlaid with the previously obtained and pre-stored aerial image/ mobile map image on the device. Thus, information from the stitched image and the pre-stored aerial image can be used together by the soldier (e.g., used simultaneously) to enhance the overall information delivered to the soldier. For example, the soldier can hold a handheld device that retains the previously obtained aerial image in memory. The aerial image can be processed before being loaded on the handheld device with information being added to the aerial image, such as identifiers, elevation information, etc. The stitched image can be aligned with the aerial image such that the soldier can simultaneously use information of both images. In one example, an enemy position can be illustrated at a location in the stitched image and the soldier can obtain elevation information of the location through the aerial image. Thus, the soldier can benefit for using both real time information and pre-processed information together. In another example, global positioning data embedded in the pre-stored aerial image/mobile map image can be used to determine the coordinates of stitched image identified data elements.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a handheld device 100 with a launch component 105 and an image stitch component 110. The launch component 105 is configured to cause a launch of a projectile 115. For example, the projectile 115 (e.g., image sensor projectile) can be launched from the handheld device 100. In one embodiment, the handheld device 100 is a smart phone, personal electronic device, laptop computer, etc. However, the projectile 115 can be considered a handheld device itself and thus comprise the launch component 105, the image stitch component 110, or other component disclosed herein.

The projectile 115 is configured to capture a plurality of images, where individual images of the plurality of images are of different segments of an area. For example, the plurality of images covers a range of about 360 degrees such that eight individual images cover about 45 degrees each with some overlap among individual images of the plurality of images, which can be seen in greater detail with FIG. 2. Thus, this is one example of where the composite image covers a view of about 360 degrees and individual images of the plurality of images cover a view of less than about 360 degrees.

The image stitch component 110 is configured to stitch the plurality of images into a composite image. In one embodiment, the composite image creates a seamless 360-degree image of an area. The composite image is of a higher resolution than a resolution of individual images of the plurality of images captured by the projectile 115. Multiple slices of the same area or overlapping area can also improve contrast and/or color balance of a target resolution of the composite image. The composite image can be an enhanced version of what could be obtained with a singular image. Thus, combining a plurality of images into a composite image can be of greater enhancement than the individual images of the plurality of images.

Figure 2:
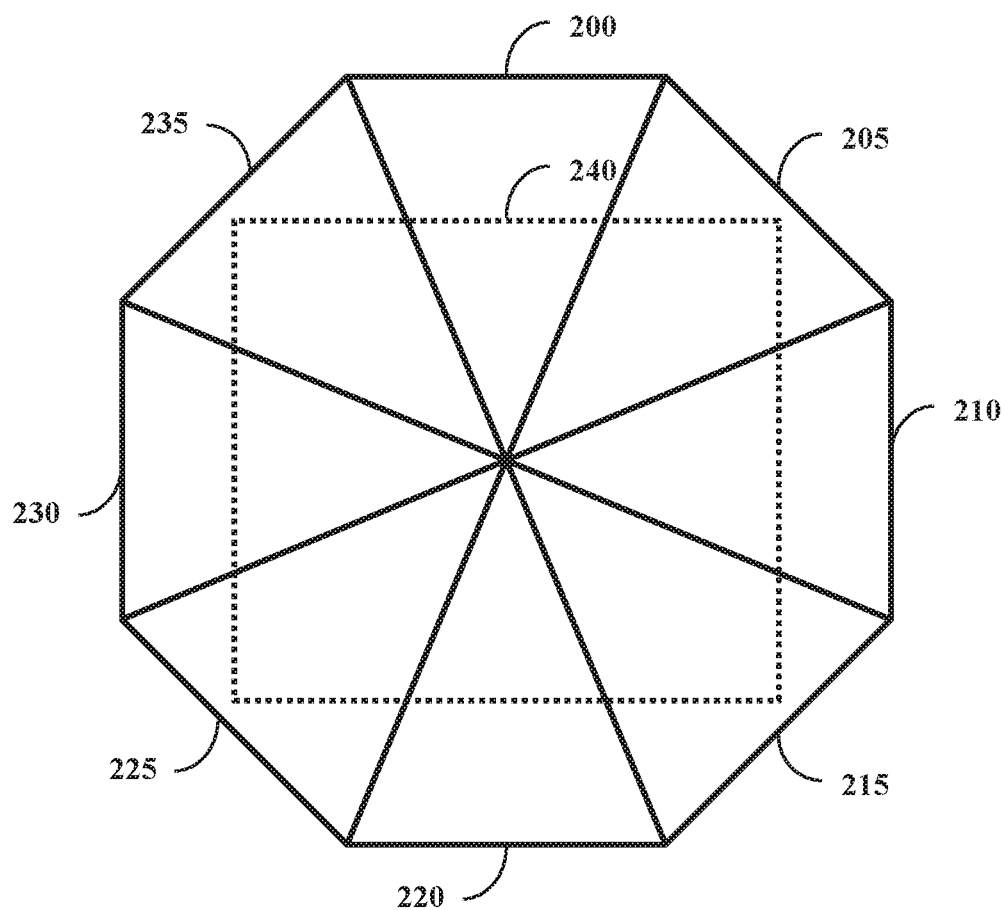
FIG. 2 illustrates one embodiment of a plurality of images with an area of interest.

FIG. 2 illustrates one embodiment of a plurality of images 200-235 with an area of interest 240. The plurality of images 200-235 can be the plurality of images captured by the projectile 115 of FIG. 1. Images discussed herein can include photographs, infrared images, radar images, and others. The plurality of images can overlap one another such that an overlap exists among at least some of the individual images. For example, the dark links separating the individual images 200-235 can be overlapping areas. The overlap can cover at least part of the area of interest 240 and at least some of the overlap is used to improve resolution of the composite image over the plurality of images 200-235.

In one embodiment, the projectile 115 of FIG. 1 can rotate and while the projectile 115 of FIG. 1 rotates a camera of the projectile captures the individual images 200-235. In one example, the projectile 115 of FIG. 1 can launch without rotation. When a particular launch condition is met, the projectile 115 of FIG. 1 can deploy wings that cause the projectile 115 of FIG. 1 to rotate. As rotation occurs, the camera can capture the individual images 200-235. Once the individual images 200-235 are captured and sent to the handheld device 100 of FIG. 1, the wings can be removed from the projectile 115 of FIG. 1, remain, etc. While eight individual images 200-235 are illustrated, it is to be appreciated by one of ordinary skill in the art that more or less than eight images can be the plurality of images with or without overlap (e.g., twelve images with overlap captured over a couple of seconds).

Figure 3:
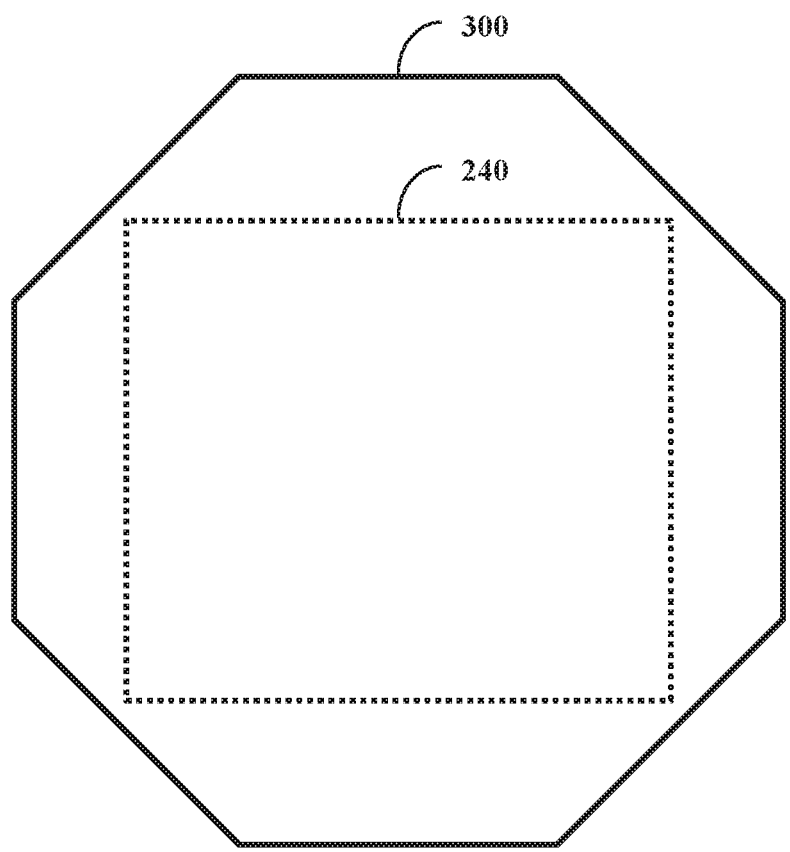
FIG. 3 illustrates one embodiment of a composite image with the area of interest.

FIG. 3 illustrates one embodiment of a composite image 300 with the area of interest 240. The image stitch component 110 of FIG. 1 can create the composite image 300 from the plurality of images 200-235 of FIG. 2. The plurality of images 200-235 of FIG. 2 can be captured by the projectile 115 of FIG. 1.

Figure 4:
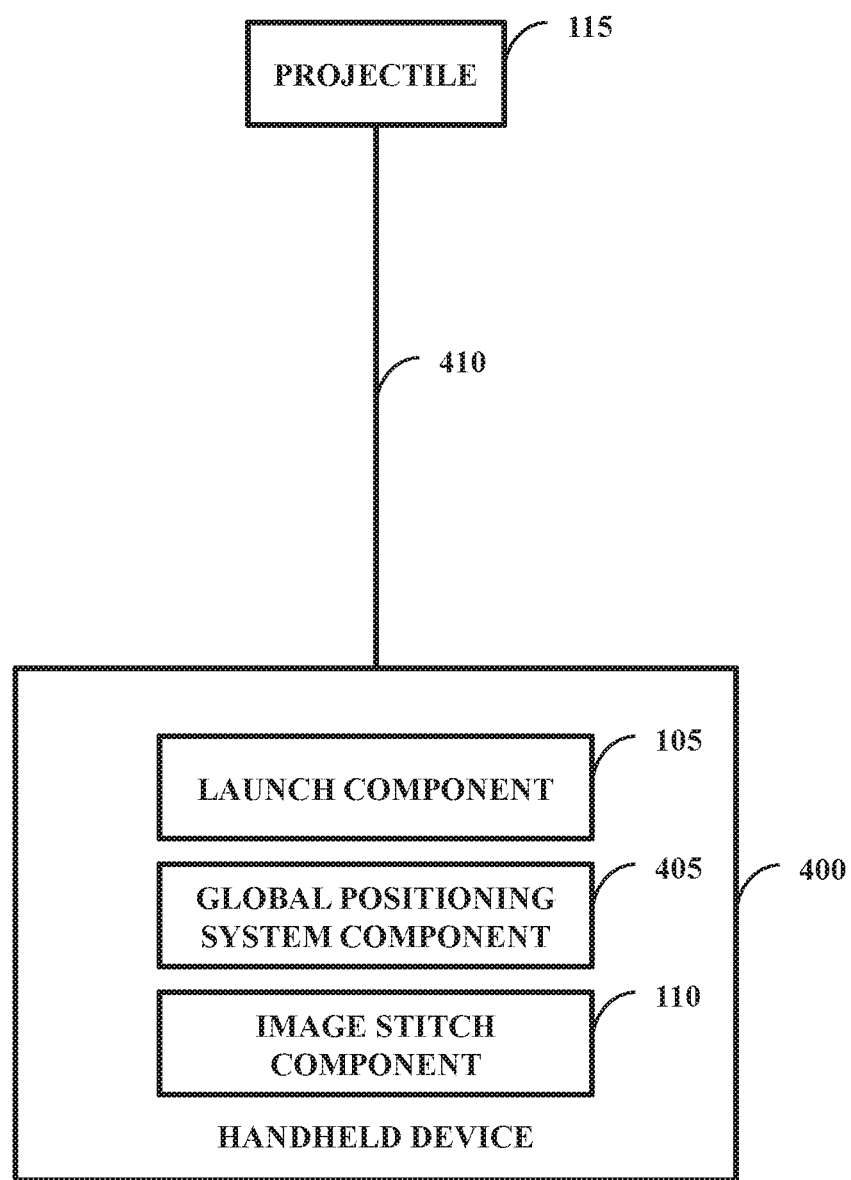
FIG. 4 illustrates one embodiment of a handheld device comprising the launch component, the image stitch component, and a global positioning system component.

FIG. 4 illustrates one embodiment of a handheld device 400 comprising the launch component 105, the image stitch component 110, and a global positioning system (GPS) component 405. The GPS component 405 is configured to provide position information (e.g., provide current position information on a display of the handheld device 400). The handheld device 400 can use the launch component 105 to cause the projectile 115 to launch.

The projectile 115 is connected to the handheld device 400 by way of a link 410. In one embodiment, the link 410 is a wireless communication link, where the plurality of images can be sent securely to the handheld device 400 from the projectile 115. In one embodiment, the link 410 is a physical link and as such the projectile 115 is configured to be tethered by the physical link to the handheld device 400 when the launch of the projectile 115 occurs. In one embodiment, the projectile 115 is configured to transmit the plurality of images to the handheld device 400 by way of the physical link. Prior to transmission, the projectile 115 can be configured to compress and/or encrypt the plurality of images and then the handheld device 400 can uncompress and/or decrypt the plurality of images before the image stitch component 110 operates on the plurality of images. The physical link can be an optical physical link, an electrical conductor, or other type of physical link. In one embodiment, the physical link employs a serialized digital image interface (e.g., over twisted pair). The power supply can be supplied to the projectile 115 by way of the physical link. The physical link can enable the projectile 115 to send information to the handheld device 400 without concern of a transmission being jammed or intercepted, which could occur with a wireless signal.

In one embodiment, the projectile 115 is a first projectile. The launch component 105 is configured to be loaded with the projectile 115. The physical link between the first projectile and the handheld device is broken after the projectile 115 transmits (e.g., successfully transmits) the plurality of images to the handheld device 400 upon descent of the projectile 115. The handheld device 400 is configured to be loaded with a second projectile after the physical link with the projectile 115 is broken. In one embodiment, the physical link is proactively broken after the projectile 115 completes transmission of the plurality of images to the handheld device 400. The handheld device 400 (e.g., via software) or the projectile 115 (e.g., via software that measures its flight pattern) can identify when the final individual image of the plurality of images is successfully received and then the handheld device 400 of FIG. 4 can cause the link 410 to be severed (e.g., without user instruction).

The handheld device 400 can include a display screen interface that displays the composite image. GPS capabilities of the GPS component 405 can be used to provide location information, where the location information can be displayed against the visual elements of the composite image. The handheld device 400 can enable the user to zoom into the composite image, pan the composite image, etc.

Figure 5:
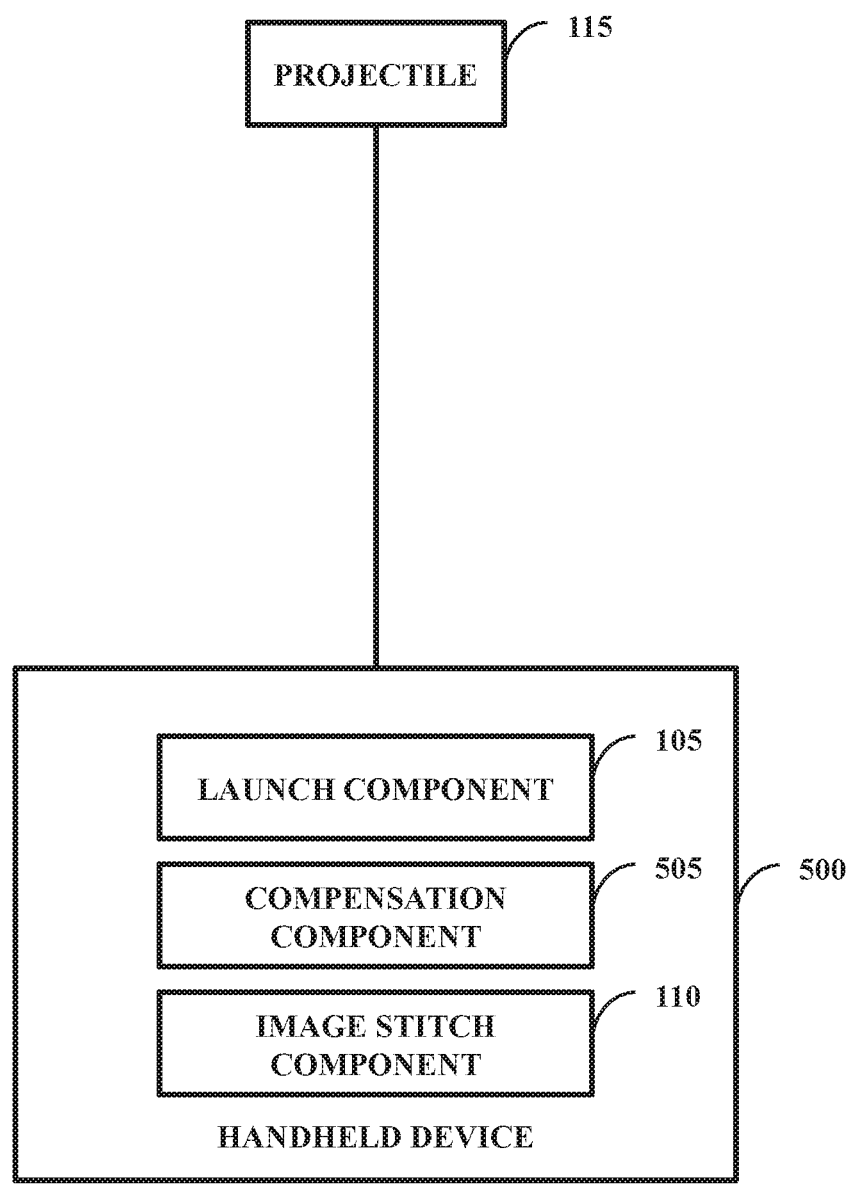
FIG. 5 illustrates one embodiment of a handheld device comprising the launch component, a compensation component, and an image stitch component.

FIG. 5 illustrates one embodiment of a handheld device 500 comprising the launch component 105, a compensation component 505, and an image stitch component 110. When the projectile 115 is launched, a camera (e.g., a simple pin-hole camera, a daytime camera and a nighttime camera where individual images of the plurality of images are taken exclusively from the daytime camera or exclusively from the nighttime camera, etc.) of the projectile 115 can capture images in series. Thus, a location of the projectile 115 when an earlier image is captured can be different from a location of the projectile 115 when a latter image is captured. A location difference can occur due to rise/fall of the projectile 115, flight path of the projectile 115, wind moving the projectile 115, and others. The location difference can change perspective of the images, such as a different capture angle, change visibility of images, etc. These changes can lead to a discrepancy between individual images.

The compensation component 505 is configured to perform a compensation for a discrepancy between at least two individual images of the plurality of images, where the discrepancy is caused by movement of the projectile 115. A result of this compensation is used by the image stitch component 110 to produce the composite image and thus the compensation component 505 aids the image stitch component 110. In one embodiment, the plurality of images comprises a first image and a second image and the discrepancy is caused by at least partially lateral movement of the projectile between when the projectile 115 captures the first image and when the projectile captures the second image. This lateral movement of the projectile 115 can occur due to wind, launch angle, etc. In one embodiment, the projectile 115 comprises an accelerometer configured to obtain a speed and vector information set for individual images of the plurality of images. The discrepancy can be observed through a difference among the speed and vector information set for individual images of the plurality of images. In one embodiment, the compensation component 505 is part of the projectile 115 and the plurality of images in a compensated form is sent to the handheld device 500.

Figure 6:
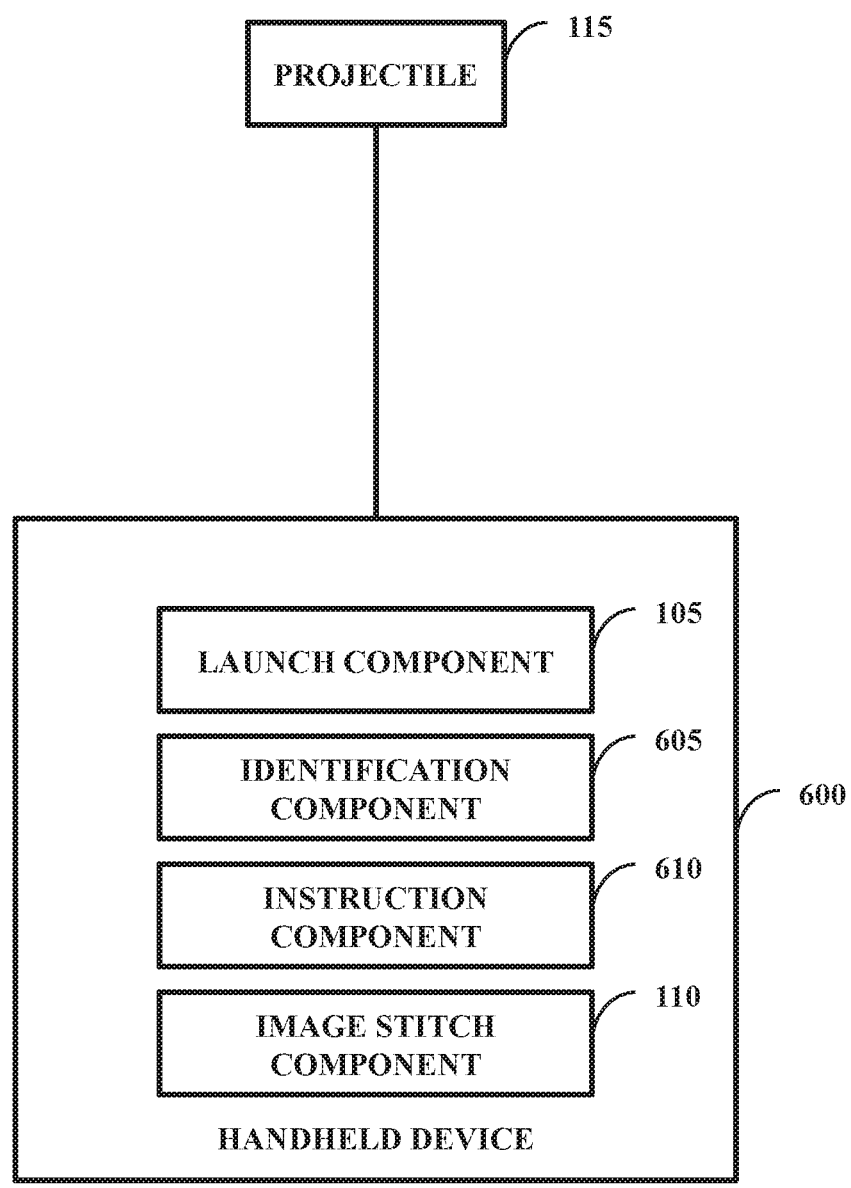
FIG. 6 illustrates one embodiment of a handheld device comprising the launch component, an identification component, an instruction component, and an image stitch component.

FIG. 6 illustrates one embodiment of a handheld device 600 comprising the launch component 105, an identification component 605, an instruction component 610, and an image stitch component 110. The identification component 605 is configured to identify a travel condition of the projectile 115 after launch. The instruction component 610 is configured to instruct the projectile 115 to take the plurality of images in response to identification of the travel condition.

In one example, the launch component 105 causes the projectile 115 to launch. The identification component 605 can monitor flight of the projectile 115. A fuel engine of the projectile 115 can separate from the projectile 115. The identification component 605 can identify this separation. The instruction component 610 can include a logic command that when fuel engine separation occurs the projection should start acquiring the plurality of images. The instruction component 610 can follow this command and instruct the projectile 115 to begin capturing the images. The projectile 115 can capture the plurality of images, send the plurality of images to the handheld device 600, and the image stitch component 110 can produce the compound image from the plurality of images.

In one example, the handheld device 600 can include an interface (e.g., monitor and keyboard) and a user can input an order by way of the interface for the projectile 115 to launch. In response to the order, the launch component 105 can cause the projectile 115 to launch in a skyward direction or other direction. The projectile 115 can travel in the air until the projectile 115 reaches its apogee (top of relatively parabolic flight) and then descends towards ground. The identification component 605 can monitor travel of the projectile 115 and determine when the apogee is reached (e.g., actually reached, about to be reached, etc.). For example, the identification component 605 can read output of a fixed accelerometer of the projectile 115 and from this reading determine when the apogee is reached. When this determination occurs, the instruction component 610 can instruct the camera of the projectile 115 to capture images, instruct how to capture images (e.g., exposure length, camera angle, etc.), etc. The captured images can be stitched together by the image stitch component 110 to form the composite image. The composite image can be displayed on a display of the handheld device 600.

Figure 7:
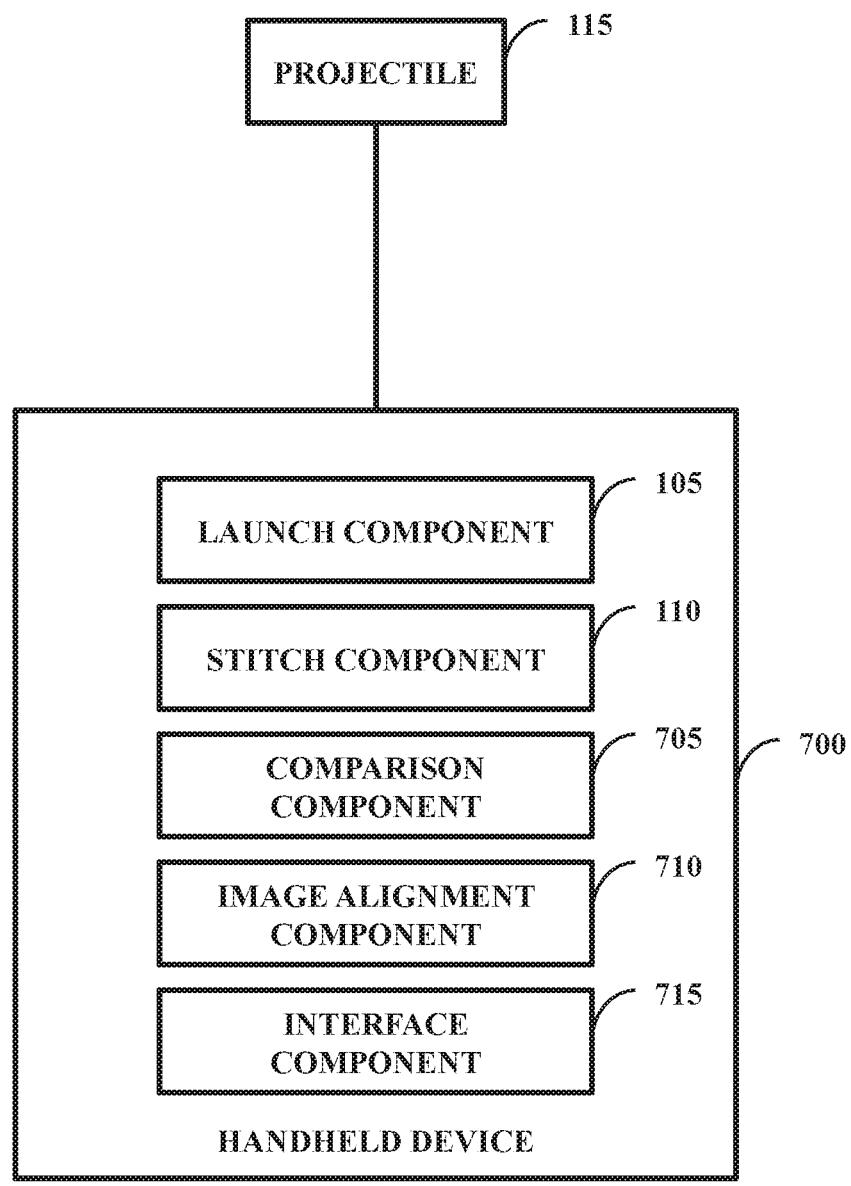
FIG. 7 illustrates one embodiment of a handheld device comprising the launch component, the image stitch component, a comparison component, an image alignment component, and an interface component.

FIG. 7 illustrates one embodiment of a handheld device 700 comprising the launch component 105, the image stitch component 110, a comparison component 705, an image alignment component 710, and an interface component 715. The launch component 105 causes the projectile 115 to launch (e.g., from the handheld device 700, from a unit in direct communication with the handheld device 700, etc.). The projectile 115 captures the plurality of images and sends the plurality of images to the handheld device 700. The image stitch component 110 creates the composite image from the plurality of images.

The comparison component 705 can be configured to make a comparison between the composite image and a retained image. The retained image can be a non-real time image of an area where at least part of the area of the non-real time image overlaps with at least part of an area of the composite image. For example, the retained image is an aerial image of a specific area stored in memory of the handheld device 700 and the composite image is a real time image of the specific area. In one embodiment, the retained image is a real time image (e.g., up-to-date satellite image).

The retained image can be sent from another unit (e.g., airplane) and retained in a memory of the handheld device 700 while the composite image can also be retained in the memory. The comparison component 705 accesses the retained image in the memory to perform the comparison between the composite image against the retained image. The comparison finds common feature set (e.g., one or more common feature) among the composite image and the retained image.

The image alignment component 710 is configured to make an aligned image from the composite image and the retained image through use of the common feature set found by the comparison component 705. For example, the comparison component 705 can identify a uniquely shaped rock formation in the retained image and the composite image. The alignment component 710 can use the identified formation to align the retained image with the composite image (e.g., overlay the retained image with the composite image through overlapping formation portions of the retained image and the composite image). The retained image aligned with the composite image forms the aligned image.

In one embodiment, the image alignment component 710 is configured to update stored mapping data for future use with fresh imagery. The comparison component 705 is configured to determine displacement of the stitched image and the offline stored image. When the offline image possesses geospatial coordinates, the coordinates of visual elements of the stitched image thus can be found, by way of the comparison component 705, by comparing the stitched image with the offline image and then transferring the geospatial coordinates from the offline image to the stitched image.

The interface component 715 is configured to cause an interface to be presented (e.g., an image displayed on the interface) that enables a user to access location information from the aligned image. For example, the retained image can be pre-processed to include coordinate information (e.g., latitude and longitude information) that becomes part of the aligned image. The composite image can illustrate an enemy troop location that is illustrated in the aligned image. The user can designate the enemy troop location through the interface and the interface can present on the aligned image coordinate information for the enemy troop location. Therefore, a soldier can gain a combined benefit of information from a real time image obtained from the projectile 115 and information of a preprocessed image.

Figure 8:
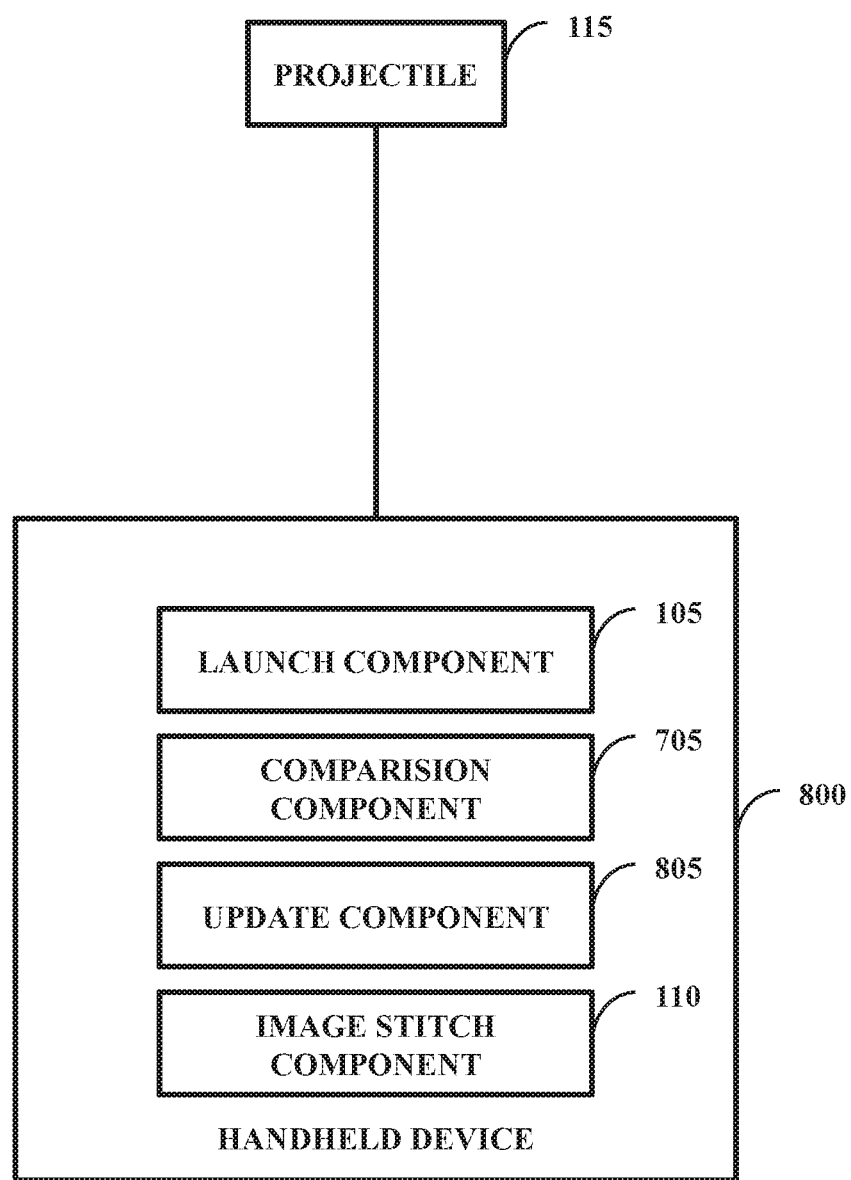
FIG. 8 illustrates one embodiment of a handheld device comprising the launch component, the comparison component, an update component, and the image stitch component.

FIG. 8 illustrates one embodiment of a handheld device 800 comprising the launch component 105, the comparison component 705, an update component 805, and the image stitch component 110. The comparison component 705 can be configured to make a comparison between the composite image against the retained image, where the comparison produces a comparison result and where the comparison result indicates at least one difference between the composite image and the retained image. The update component 805 is configured to cause an update upon the retained image, where the update is a modification of the retained image such that the at least one difference is eliminated.

In one example, an airplane can take photographs of a specified area and these photographs can be the retained image that is retained in storage. These photographs can become out-of-date, be missing information (e.g., due to cloud cover), etc. When the composite image is created of the specified area, the composite image can be considered more up-to-date than the retained image, more accurate than the retained image, etc. The comparison component 705 can identify differences between the retained image and the composite image and the update component 805 can update the retained image. In one embodiment, updating occurs when the retained image is modified with information from the composite image. In one embodiment, updating occurs when the retained image is replaced by the composite image and thus the composite image becomes the retained image. In one embodiment, the update component 805 causes the updated by sending an update instruction to a central repository of images that holds the retained image. In one embodiment, the projectile 115 sends the plurality of images and/or the composite image to the central repository of images along with the update instruction.

Figure 9:
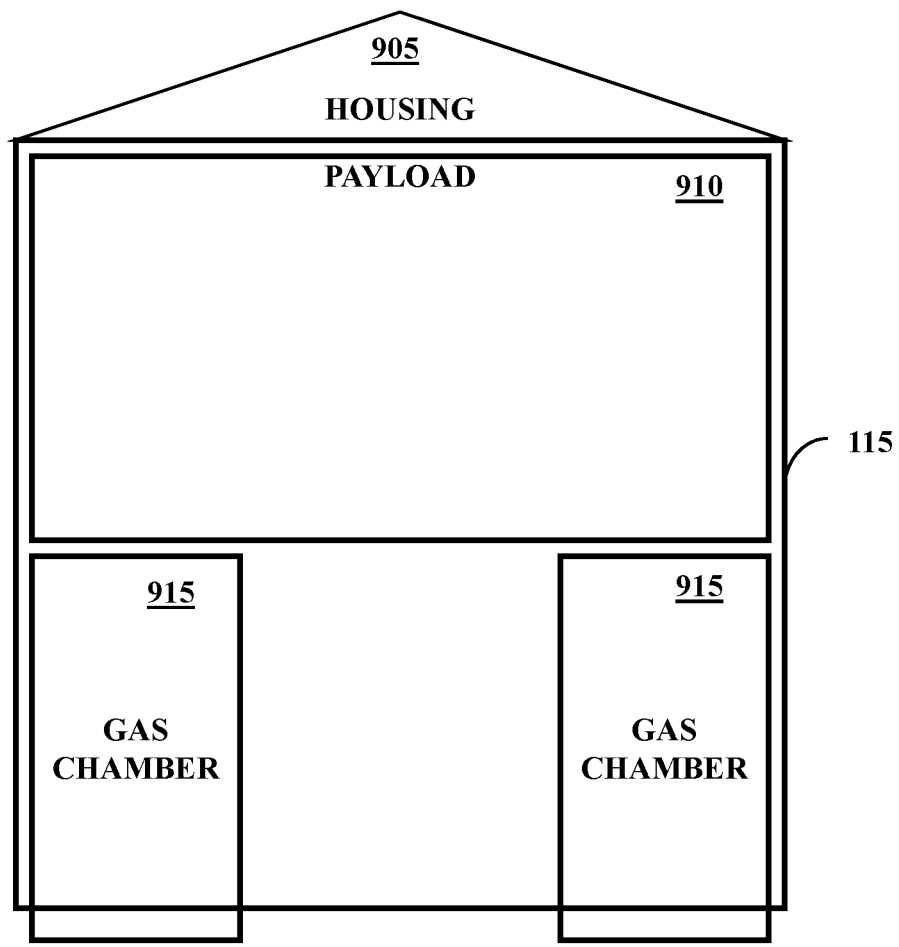
FIG. 9 illustrates one embodiment of the projectile comprising a housing, a payload, and a pair of gas chambers.

FIG. 9 illustrates one embodiment of the projectile 115 comprising a housing 905, a payload 910, and a pair of gas chambers 915. While the pair of gas chambers 915 is shown, other configurations are possible such as a single rocket engine. The projectile 115 can be attached to a mobile controller performing image stitching (e.g., a handheld device disclosed herein) by way of a coiled tether that uncoils as the projectile 115 travels. This attachment can include a physical attachment as well as being communicatively attached such that transmission of the plurality of images can occur wirelessly (e.g., by way of Wi-Fi). The mobile controller or the housing 905 can include a blade to cut the tether once images are captured. The housing 905 can incorporate features that assist in flight of the projectile 115. For example, the housing 905 can have a point to allow for a maximum upward trajectory (e.g., a higher trajectory can enable the projectile 115 to reach over high trees), the housing 905 can have wings (e.g., deployable wings (e.g., deployed when a certain condition is met, such as speed), fixed wings, etc.) to provide a wobble of the projectile 115 or to stabilize the projectile 115.

A payload 910 of the projectile 115 can include an image capture component (e.g., the camera (e.g., visible light camera, infrared camera, etc.)), at least one sensor (e.g., video sensor), infrared illuminator, digital storage, a microprocessor (e.g., configured to compress captured images prior to their transmission to the handheld device 100 of FIG. 1, where the handheld device 100 of FIG. 1 is configured to decompress the captured images and the create the composite image), a receiver, a transmitter, a self-destruct mechanism, etc. The payload 910 can include multiple image capture components to increase resolution (e.g., each image capture component facing a different direction) and can include multiple video sensors to yield quicker system response and faster stitching by the image stitch component 110 of FIG. 1. A sensor of the payload 910 can identify when a certain situation occurs (e.g., a top portion of flight of the projectile 115). In response to the certain situation occurring, the payload 910 can use the image capture component to capture the plurality of images. The payload 910 can send the plurality of images captured to the handheld device 100 of FIG. 1. The handheld device 100 of FIG. 1 can send a confirmation message to the projectile 115 that the plurality of images is successfully received and in response to receiving the confirmation message, the payload 910 can destroy at least one component of the projectile 115 (e.g., so hardware or software does not fall into enemy hands). In one embodiment, the payload 910 can be selected by a user (e.g., the user places at least some payload component in the payload 910 prior to loading the projectile 115 in the handheld device 100 of FIG. 1, user selects payload components that are loaded from the handheld device 100 of FIG. 1 to the payload 910 while the projectile 115 is loaded in the handheld device 100 of FIG. 1, etc.).

The payload 910 can include other features to enhance capabilities of the projectile 115. In one example, the payload 910 includes weather measurement instruments, where weather information is captured and sent to the handheld device 100 of FIG. 1. In one example, the payload 910 measures performance of the projectile 115 (e.g., projectile speed, information related to the projectile 115 experiencing a failure, etc.). Performance information of the projectile 115 can be sent to the handheld device 100 of FIG. 1 and be evaluated by a user for use in subsequent launches.

The launch component 105 of FIG. 1 can cause the projectile 115 to launch in order to collect images. The handheld device 100 of FIG. 1 can launch multiple projectiles consecutively, concurrently, at different times, etc. In one embodiment, a first projectile is launched with a first payload. The first payload can include weather measurement instruments that measure weather information. The measured weather information along with performance data of the first projectile can be sent to the handheld device 100 of FIG. 1. A processor of the handheld device can use the measured weather information and performance data of the first projectile to calibrate launches of subsequent projectiles. For example, an interface of the handheld device 100 of FIG. 1 can display a recommended adjustment launch angle.

To launch the projectile 115, a pair of gas chambers 915 can be engaged where the force of exiting gas causes the projectile 115 to launch. While shown as part of the projectile 115, the gas chambers 915 may implement as part of the handheld device 100 of FIG. 1. In one embodiment, the gas chambers 915 are filled with compressed air. Causing the gas chambers 915 to engage can constitute launch of the projectile 115. In one embodiment, gas from the gas chamber is clean and odorless and causing the gas chambers 915 to engage is silent. While a pair of gas chambers 915 are illustrated, it is to be appreciated by one of ordinary skill in the art that the projectile 115 can implement with one gas chamber, with more than two gas chambers, or with a different launch implementation (e.g., a non-gas chamber launch implementation, such as a catapult or use of a chemical rocket propellant). In one embodiment, the projectile 115 can have the pair of gas chambers 915 separate from the projectile 115 and this separation causes the acquisition of images to begin.

Figure 10:
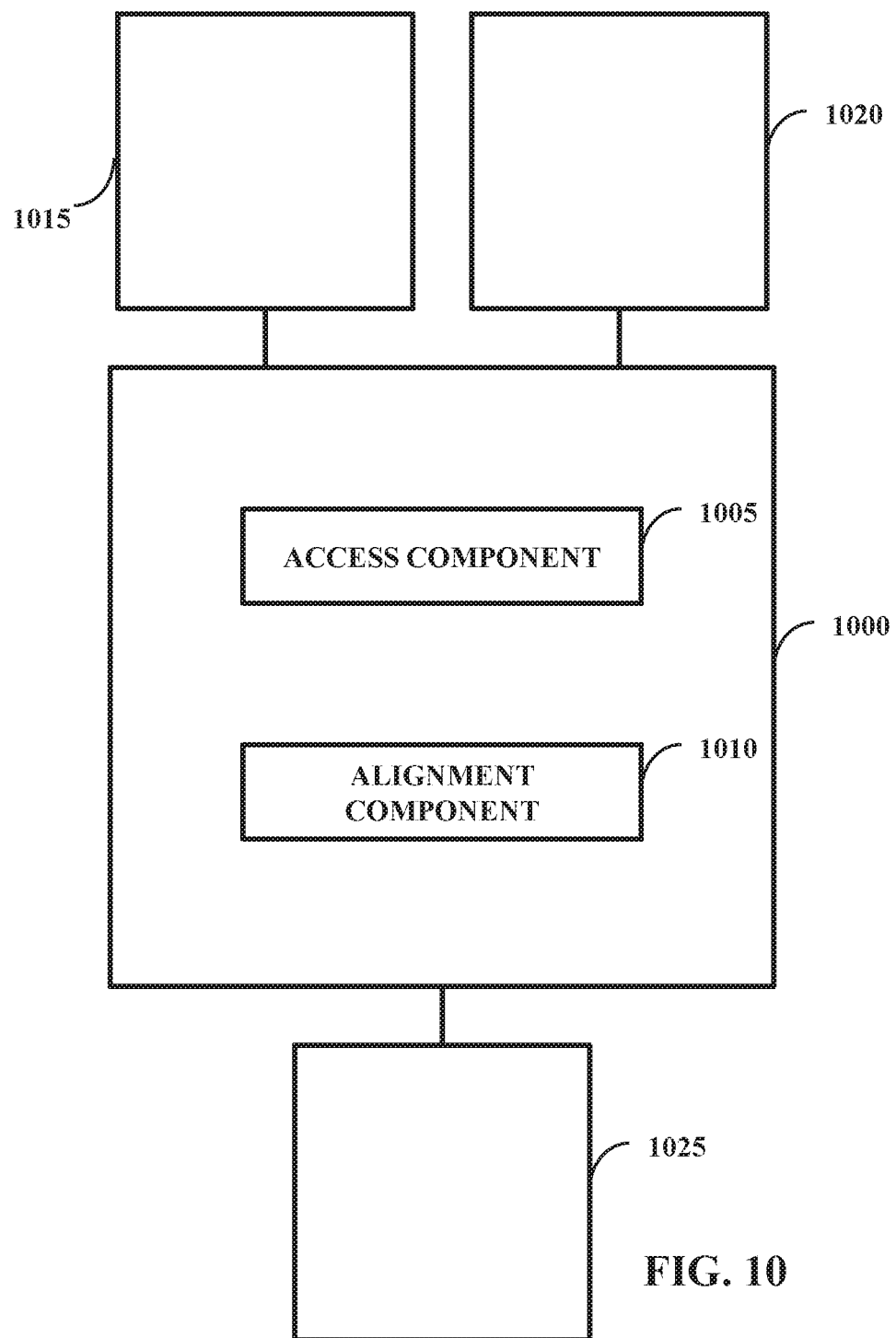
FIG. 10 illustrates one embodiment of a system comprising an access component and an alignment component.

FIG. 10 illustrates one embodiment of a system 1000 (e.g., configured for implementation on a handheld device described herein) comprising an access component 1005 and an alignment component 1010. The access component 1005 is configured to access a stitched image 1015 of a location and an offline image 1020 of the location. The alignment component 1010 is configured to align the stitched image 1015 and the offline image 1020, where the stitched image 1015 is a real-time image and the offline image 1020 is a non-real-time image. The alignment component 1010 can produce an aligned image 1025 as an output, where the aligned image 1025 is the stitched image 1015 combined with the offline image 1020.

In one embodiment, the alignment component 1010 combines the stitched image 1015 with the offline image 1020 through use of feature extraction and feature mapping to form the aligned image 1025. The aligned image 1025 can be a new image or a modified version of the stitched image 1015 or the offline image 1020. In one example, the stitched image 1015 and the offline image 1020 can be aligned with one another (to form the aligned image 1025) and displayed together on an interface of the system 1000. These images displayed together can provide a Warfighter with geospatial information, blue force position, update of offline imagery and maps, etc. With the aligned image 1025, geo-localization data (e.g., map coordinates, latitude and longitude, etc.) can be presented along with real-time information.

In one embodiment, the aligned image 1025 is presented on a display of the handheld device 100. In one embodiment, the stitched image 1015 is presented on the display of the handheld device 100 of FIG. 1 after the aligned image 1025 is created. When a part of the stitched image 1015 is indicated by a user, geo-localization data can be presented on the display that is derived from the aligned image 1025 (e.g., latitude and longitude of a particular position). In one embodiment, the stitched image 1015 is the composite image and the offline image 1020 is the retained image. In one embodiment, the composite image is the stitched image 1015 and the retained image is the offline image 1020.

In one embodiment, the stitched image is a compound image of segment images. The segment images are of a lower resolution then a resolution of the compound image. The offline image 1020 can be a map of an area taken aerially. The map can be augmented with information (e.g., latitude and longitude information, man-made structure information, geographical landmark information, etc.). The segment images can be images of the area taken from a machine-launched projectile (e.g., the projectile 115 of FIG. 1 launched from the handheld device 100 of FIG. 1).

Figure 11:
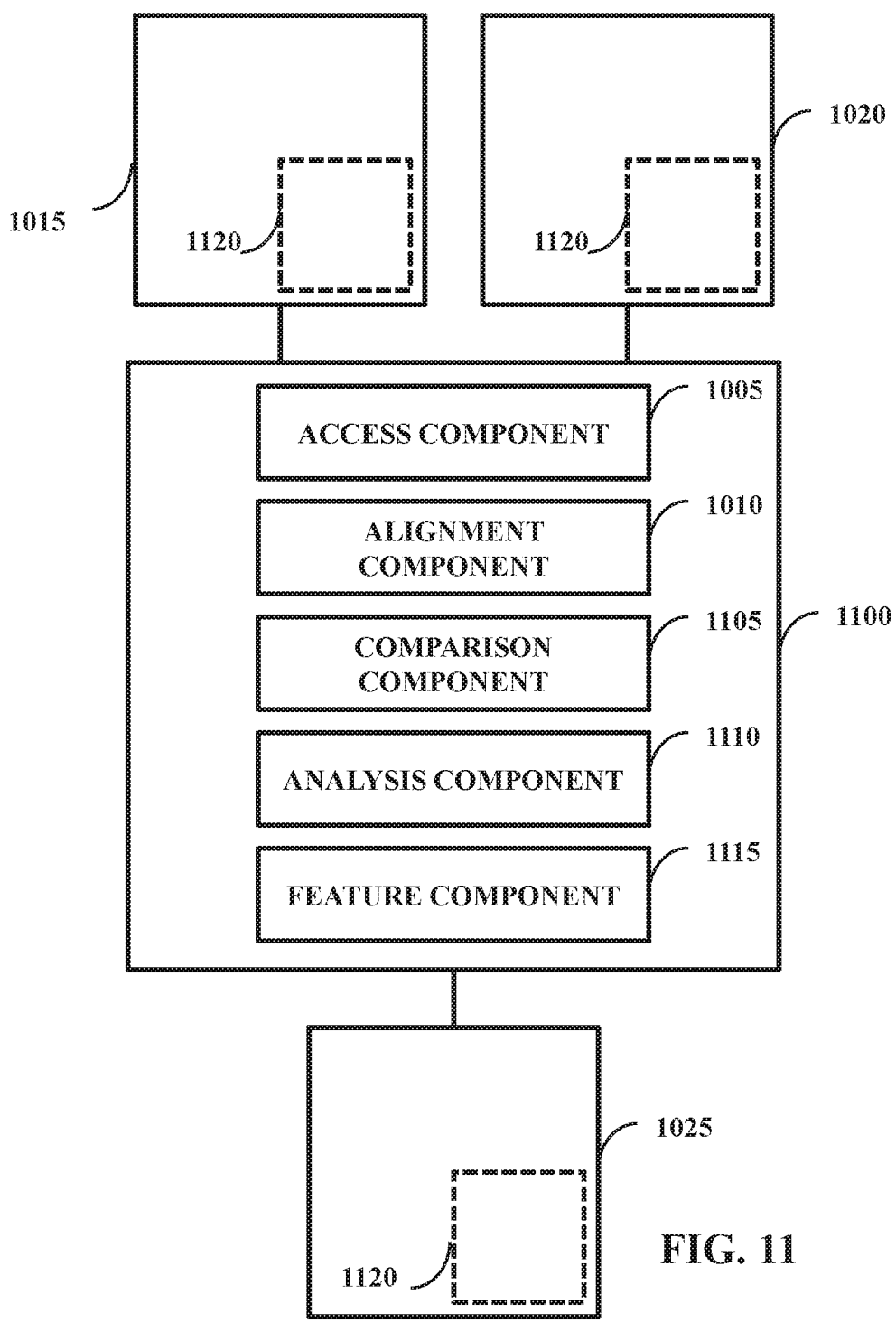
FIG. 11 illustrates one embodiment of a system comprising the access component, the alignment component, a comparison component, an analysis component, and a feature component.

FIG. 11 illustrates one embodiment of a system 1100 (e.g., configured for implementation on a handheld device described herein) comprising the access component 1005, the alignment component 1010, a comparison component 1105, an analysis component 1110, and a feature component 1115. The comparison component 1105 is configured to make a comparison between the stitched image 1015 against the offline image 1020. The analysis component 1110 is configured to perform an analysis on a result of the comparison. The feature component 1115 is configured to find a common feature set 1120 (e.g., one or more common feature) among the stitched image 1015 and the offline image 1020 through employment of a result of the analysis. The alignment component 1010 uses the common feature set 1120 to align the stitched image 1015 and the offline image 1020. The system 1100 can output the aligned image 1025, where the aligned image 1025 includes the common feature set 1120.

In one embodiment, a solider can cause the projectile 115 of FIG. 1 to launch and capture the stitched image 1015 (e.g., capture an initial image and stitch on the fly as subsequent images are captured, capture individual images that are stitched together to form the stitched image, etc.). The analysis component 1110 can perform an evaluation of the stitched image 1015 and locate an offline image 1020 that corresponds to the stitched image 1015 (e.g., perform a search for the offline image 1020 based on the common feature set 1120 of the stitched image 1015 such that the offline image 1020 has a feature set matching the common feature set 1120). The comparison component 1105 can compare the stitched image 1015 with the offline image 1020 and the analysis component 1110 can use a result of this comparison to determine if a found image should be the offline image 1020. In one embodiment, a user selects the offline image 1020.

The comparison component 1105 compares the stitched image 1015 against the offline image 1020. In one example, the comparison component 1105 can identify a river in the stitched image 1015. The comparison component 1105 can then find the river in the offline image 1020. The analysis component 1110 determines that the rivers match and based on this match, the feature component 1115 designates the river in the stitched image 1015 and the offline image 1020 as part of the common feature set 1120. Using the common feature set, the alignment component 1010 can align the stitched image 1015 with the offline image 1020 to produce the aligned image 1025 (e.g., for Warfighter display and target destination purposes). The alignment performed by the alignment component 1010 can be creating a new aligned image from the stitched image 1015 and the offline image, superimpose the stitched image 1015 on the offline image 1020 to produce the aligned image 1025, superimpose the offline image 1020 on the stitched image 1015 to produce the aligned image 1025, etc. The system 1100 can cause the aligned image 1025 to be displayed on a display (e.g., a display of a device that retains at least part of the system 1100, a separate display, etc.).

Figure 12:
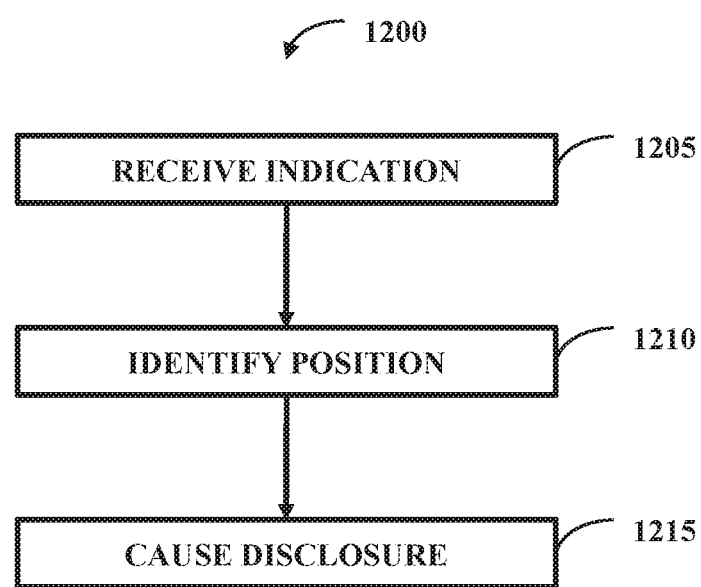
FIG. 12 illustrates one embodiment of a method.

FIG. 12 illustrates one embodiment of a method 1200. Receiving an indication of a location of a combination image can occur at 1205 of the method 1200. The combination image results from stitching a set of sub-combination images together, where the combination image is of a higher resolution than a resolution of individual images of the sub-combination image and where the sub-combination images are a real-time image of a vicinity. At 1210, identifying a position of the location by comparing the combination image against a non-real-time image of the vicinity occurs. At 1215, causing an information set that is indicative of the position to be disclosed on an interface occurs. In one embodiment, the interface and the system 1200 of FIG. 12 are part of the handheld device 100 of FIG. 1.

In one embodiment, the information set that is indicative of the position is displayed concurrently with the combination image on the interface. In one embodiment, the indication is received from the interface (e.g., by a user touching an area of the interface) and the set of sub-combination images are captured by a launched projectile (e.g., the projectile 115 of FIG. 1).

In one embodiment, the information set is a command message set (e.g., one or more command messages). An individual command of the command message set causes a battle command action to occur, when selected, at a locality that is indicated by the location of the combination image. For example, an artillery soldier can use the handheld device 100 of FIG. 1 and the handheld device 100 of FIG. 1 can implement the method 1200. The artillery soldier can designate a specific location of the combination image and request an artillery strike at the specific location. The handheld device 100 can send an instruction to an artillery unit to cause the artillery strike at the specific location. The action can be sending the instruction, the artillery strike, etc. In one embodiment, the action can be to designate locations for further reconnaissance or situation updates or to cause update to occur (e.g., instructions being retained in memory and then send to a reconnaissance unit wirelessly).

Figure 13:
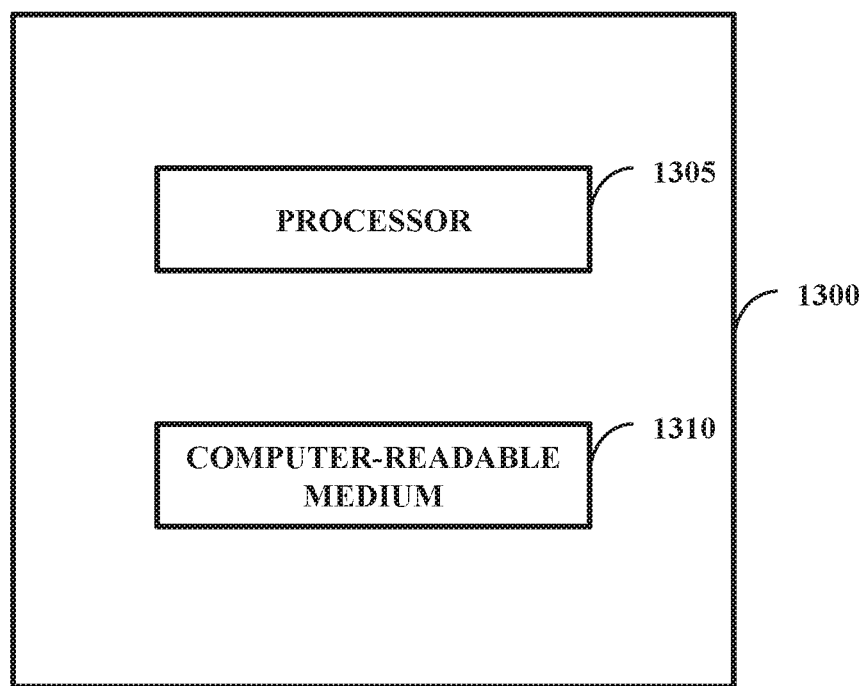
FIG. 13 illustrates one embodiment of a system comprising a processor and a computer-readable medium.

FIG. 13 illustrates one embodiment of a system 1300 comprising a processor 1305 and a computer-readable medium 1310 (e.g., the memory). In one embodiment, the method 1200 of FIG. 12 may be implemented as computer executable instructions where the computer-readable medium 1310 (e.g., Read Only Memory, Random Access Memory, hard drive, etc.) stores the computer executable instructions that when executed by a machine (e.g., the processor 1305) cause the machine to perform the method 1200.

Aspects disclosed herein allow an individual to perform visual reconnaissance of his or her immediate surroundings. For example, the individual can use aspects disclosed herein to capture image of an area of radius of about one-hundred meters from the individual. The handheld device 100 of FIG. 1 and the projectile 115 of FIG. 1 can be lightweight, portable, and relatively unobtrusive. Deployment of the projectile 115 of FIG. 1 can be difficult to detect by hostile elements (e.g., the projectile 115 can be shot about perpendicular to the ground). In one embodiment, the artillery soldier can carry a case of projectiles 115 in his or her pocket. After an initial projectile is used, it can be separated from the handheld device 100 of FIG. 1 and a subsequent projectile can be loaded and used. Due to the real-time nature of an image captured by the projectile 115 of FIG. 1, a user can quickly gain valuable information.

Various soldiers and other individuals can use aspects disclosed herein to survey their immediate surroundings such that a subject of surveillance is not made aware of the individual's presence or presence of the surveillance. In one example, dismounted soldiers can use aspects to surreptitiously reconnoiter their immediate surroundings. In one example, police can use aspects to track criminals, assist in crown control, gain information in a hostage situation, etc. In one example, animal inventory specialists or hunter can use aspects to scan for nearby animals without alarming the animals. Aspects disclosed herein can be used to avoid detection while gaining surveillance information. Aspects disclosed herein can be used on manned or unmanned vehicles.

The handheld device 400 of FIG. 4 can be a modified smart phone with an attached device to receive data from the link 410 of FIG. 4. Processing can be done on the handheld device 400 of FIG. 4. For example, the processor 1305 of FIG. 13 can be a processor of the handheld device 400 of FIG. 4 and the processor 1305 of FIG. 13 can stitch the plurality of images together into the combination image. The handheld device 400 of FIG. 4 can be hardened and weatherproof to improve durability (e.g., be surrounded by a durable plastic compound, have a cover molded in one piece to minimize water entry, etc.).

To collect the plurality of images, the projectile 115 of FIG. 9 can launch (e.g., upward towards the sky, underwater, etc.) from the handheld device 400 of FIG. 4. The payload 810 of FIG. 9 can cause the camera or projectile 115 of FIG. 8 to pan around viewing a somewhat large angle than the camera would not be able to view without panning. The camera can aim underneath the projectile 115 of FIG. 9 and thus face downward. The camera can have a relatively narrow capture angle (e.g., about 45 degrees) and the plurality of images (e.g., two or more images) can be stitched together to form a greater capture angle. For example, as shown in FIG. 2, individual images 200-235 of FIG. 2 can each have a capture angle of about 45 degrees, but when stitched together a combination image can have a capture angle of about 360 degrees.

As the projectile 115 of FIG. 1 rises, the individual images 200-235 of FIG. 2 are captured. As a result, a first image (e.g., individual image 200 of FIG. 2) may be taken at a different altitude than a second image (e.g., individual image 205 of FIG. 2). Due to the change in altitude, a discrepancy may exist between individual image 200 of FIG. 2 and individual image 205 of FIG. 2, such as different perspective, different distances of objects, etc. The compensation component 505 of FIG. 5 can compensate for this discrepancy. In one embodiment, an algorithm run by the compensation component 505 of FIG. 5 can factor out wind or other flight dynamic related displacement when the handheld device 500 of FIG. 5 creates the combination image. In addition, the handheld device 500 of FIG. 5 can use other components, such as an accelerometer of the projectile 115 of FIG. 1 to collect speed and direction vectors of individual images 200-235 of FIG. 2, to determine the discrepancy and determine an appropriate corrective action.

In one embodiment, the projectile 115 of FIG. 1 captures a relatively large number of images. The image stitch component 110 of FIG. 1 uses an image size determination algorithm to determine a phase of an initial payload descent. Based on this phase, the image stitch component 110 of FIG. 1 can select the plurality of images used to produce the composite image from the relatively large number of images. In one embodiment, a timer can be employed to select which images are part of the plurality of images and/or when the begin/end image capturing by the projectile 115 of FIG. 1.

The handheld device 100 of FIG. 1 can include a launch chamber where the projectile 115 of FIG. 1 is launched from and where a user loads the projectile 115 of FIG. 1. The launch chamber can include a shaft or barrel with screw guides that facilitate the projectile 115 of FIG. 1 to launch with a spiral. In one embodiment, the projectile 115 of FIG. 9 can position or otherwise use the gas chambers 915 to cause launch with a spiral. Spiraling of the projectile 115 of FIG. 9 can be used to capture the individual images 200-235 of FIG. 2 at different angles (e.g., thus the camera remains static with reference to the projectile 115 of FIG. 9). In one embodiment, at least one fin (e.g., retractable, fixed, etc.) of the housing 905 of FIG. 9 can cause spiraling of the projectile 115 of FIG. 9 (e.g., the projectile 115 of FIG. 9 being of a size of a cigarette or an average human male finger).

It is to be appreciated by one of ordinary skill in the art that references to one item in one figure is not limiting to that embodiment. For example, a reference to the handheld device 100 of FIG. 1 can also be applied to the handheld device 400 of FIG. 4.

What is claimed is:

1. A system, comprising:
a handheld device;
an access component configured to access a stitched image of a location and an offline image of the location; and
an alignment component configured to align the stitched image and the offline image; and
a disclosure component configured to concurrently cause disclosure of the stitched image and the offline image aligned together on the handheld device,
where the stitched image is a more recently captured image than the offline image,
where the access component, alignment component, and disclosure component are resident upon the handheld device, and
where geo-location data is displayed concurrently with the stitched image and the offline image on the handheld device.

2. The system of claim 1,
where the geo-location data is displayed concurrently with the stitched image in response to a request for the geo-location data after the stitched image and the offline image aligned together are concurrently displayed on the handheld device.

3. The system of claim 1,
where the geo-location data comprises map coordinates.

4. The system of claim 1,
where the geo-location data comprises latitude and longitude.

5. The system of claim 1,
where real-time information is displayed concurrently with the geo-location data.

6. The system of claim 1, comprising:
an identification component configured to make an identification of a part of the stitched image indicated by a user; and
a causation component configured to cause the geo-location data to be displayed on the handled device in response to the identification.

7. The system of claim 6,
where the geo-location data is displayed at the part.

8. The system of claim 6,
where the geo-location data is displayed about the part.

9. The system of claim 1,
where the geo-location data is derived from the stitched image and the offline image aligned together.

10. The system of claim 1,
where the stitched image is a compound image of segment images,
where the segment images are of a lower resolution then a resolution of the compound image,
where the offline image is a map of an area taken aerially, and
where the segment images are images of the area taken from a machine-launched projectile.

11. A system, comprising:
an access component configured to access a stitched image of a location and an offline image of the location;
an alignment component configured to align the stitched image and the offline image, where the stitched image is captured after the offline image is captured;
an analysis component configured to perform an evaluation on the stitched image, search through a plurality of offline images, and locate the offline image from the plurality of offline images based, at least in part, on a result of the evaluation and a result of the search; and
a disclosure component configured to concurrently cause disclosure of the stitched image of the location and the offline image of the location aligned together on a handheld device,
where the access component, the alignment component, the analysis component, the disclosure component, or a combination thereof are implemented, at least in part, by way of non-software.

12. The system of claim 11,
where the stitched image is a compound image of segment images,
where the segment images are of a lower resolution then a resolution of the compound image,
where the offline image is a map of an area taken aerially, and
where the segment images are images of the area taken from a machine-launched projectile.

13. The system of claim 11,
where the disclosure component is configured to cause disclosure of geo-location data that is displayed concurrently with the stitched image and the offline image on the handheld device.

14. The system of claim 13,
where the geo-location data comprises map coordinates.

15. The system of claim 13,
where the geo-location data comprises latitude and longitude.

16. The system of claim 13,
where the geo-location data is derived from the stitched image and the offline image aligned together.

17. The system of claim 13,
where the geo-location data is displayed concurrently with the stitched image in response to a request for the geo-location data after the stitched image and the offline image aligned together are concurrently displayed on the handheld device.

18. A system, comprising:
a processor; and
a computer-readable medium that stores an executable instruction set that when executed by the processor cause the processor to cause implementation of a component set, the component set comprising an access component, an alignment component, a comparison component, and an update component,
where the access component, when implemented, accesses a stitched image of a location and an offline image of the location;
where the alignment component, when implemented, aligns the stitched image and the offline image, where the stitched image is obtained before the offline image is obtained;
where the comparison component, when implemented, makes a comparison between the stitched image against the offline image to produce a comparison result that indicates at least one difference between the stitched image and the offline image; and
where the update component, when implemented, updates the offline image such that the at least one difference is eliminated.

19. The system of claim 18,
where the stitched image is a compound image of segment images,
where the segment images are of a lower resolution then a resolution of the compound image,
where the offline image is a map of an area taken aerially, and
where the segment images are images of the area taken from a machine-launched projectile.

20. The system of claim 18, comprising:
where the component set comprises an analysis component configured that performs an evaluation on the stitched image, search through a plurality of offline images, and locate the offline image from the plurality of offline images based, at least in part, on a result of the evaluation and a result of the search,
where the evaluation is performed after the stitched image is accessed, and
where the offline image is aligned after being located.

* * * * *